United States Patent [19]

Carroll et al.

[11] 4,423,545
[45] Jan. 3, 1984

[54] MACHINING CENTER

[75] Inventors: Richard R. Carroll, Chagrin Falls; Alan M. Papp, Eastlake, both of Ohio

[73] Assignee: Litton Industrial Products, Inc., Cleveland, Ohio

[21] Appl. No.: 290,411

[22] Filed: Aug. 5, 1981

[51] Int. Cl.³ ............................................. B23Q 3/157
[52] U.S. Cl. ........................................ 29/568; 414/730
[58] Field of Search ................... 29/568, 338, 26 A; 414/730

[56] References Cited

U.S. PATENT DOCUMENTS

| | | | |
|---|---|---|---|
| 3,256,600 | 6/1966 | Swanson et al. | 29/568 |
| 3,543,375 | 12/1970 | Williamson et al. | 29/33 P |
| 3,591,920 | 7/1971 | Brainard et al. | 29/568 |

Primary Examiner—Z. R. Bilinsky
Attorney, Agent, or Firm—Spencer T. Smith

[57] ABSTRACT

A machining center comprising a tool spindle, a tool magazine, a tool shuttle assembly for transferring tools between the tool spindle and the tool magazine including rail means, a tool change mechanism including a carriage, means for mounting the carriage on the rail means for displacement therealong, a dynamically brakeable motor for driving the tool change mechanism along the rail means in a selected direction, means for stopping the tool change mechanism driven in the selected direction including first proximity switch means secured to the carriage at a selected spacing from the rail means for maintaining the condition of the proximity switch means as the carriage is displaced along the rail means, opening means in the rail means at a selected location for changing the condition of the first proximity switch means as the carriage means is displaced in the selected direction along the rail means, second proximity switch means secured to the rail means, the tool change mechanism including a projecting element for changing the condition of the second proximity switch means from a first condition to a second condition as the tool change mechanism is displaced therealong, the projecting element being selectively located and the opening being selectively configured so that the first and second proximity switches will simultaneously have the second condition when the tool change mechanism is at the predetermined position.

3 Claims, 3 Drawing Figures

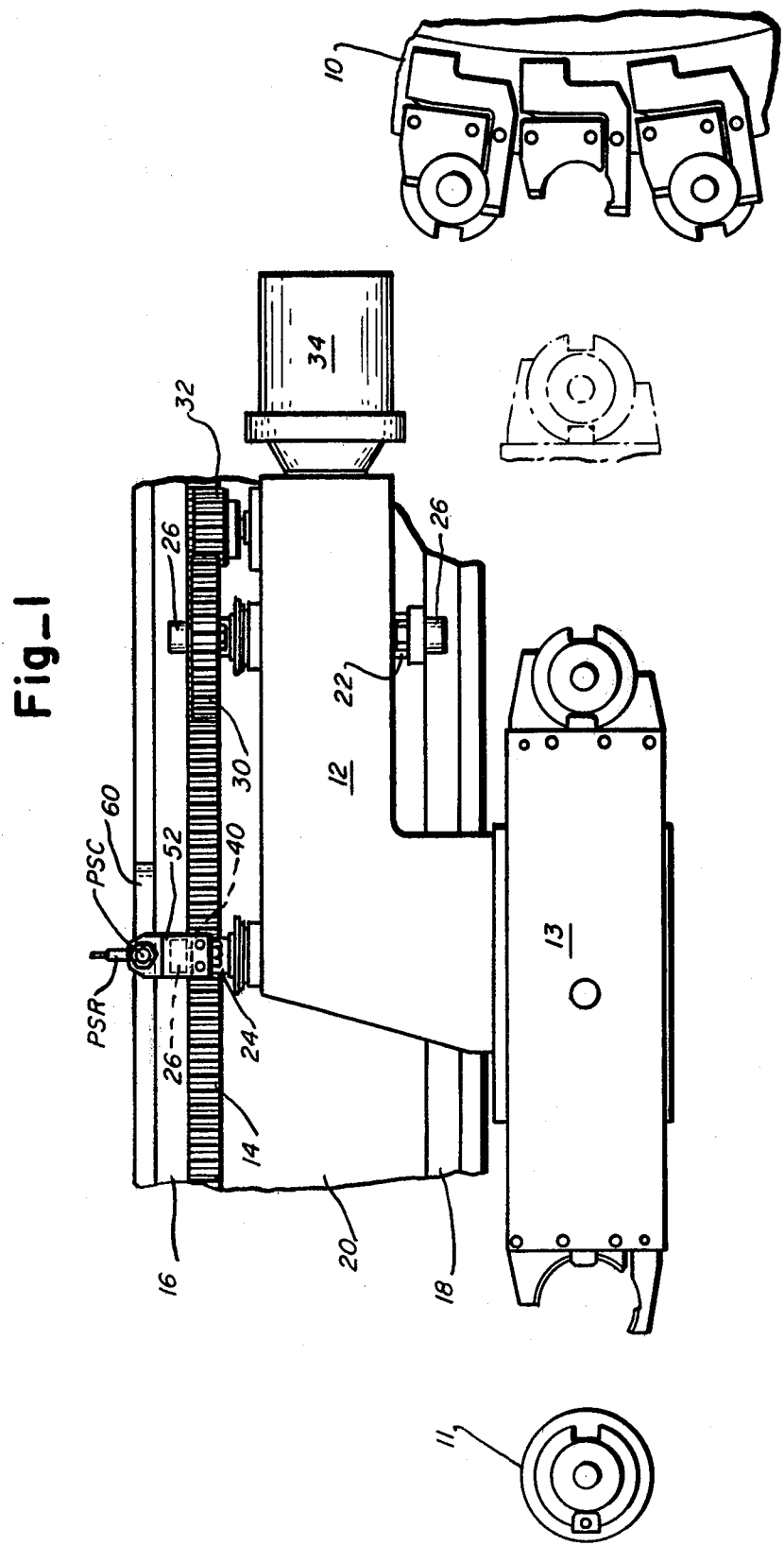
Fig_1

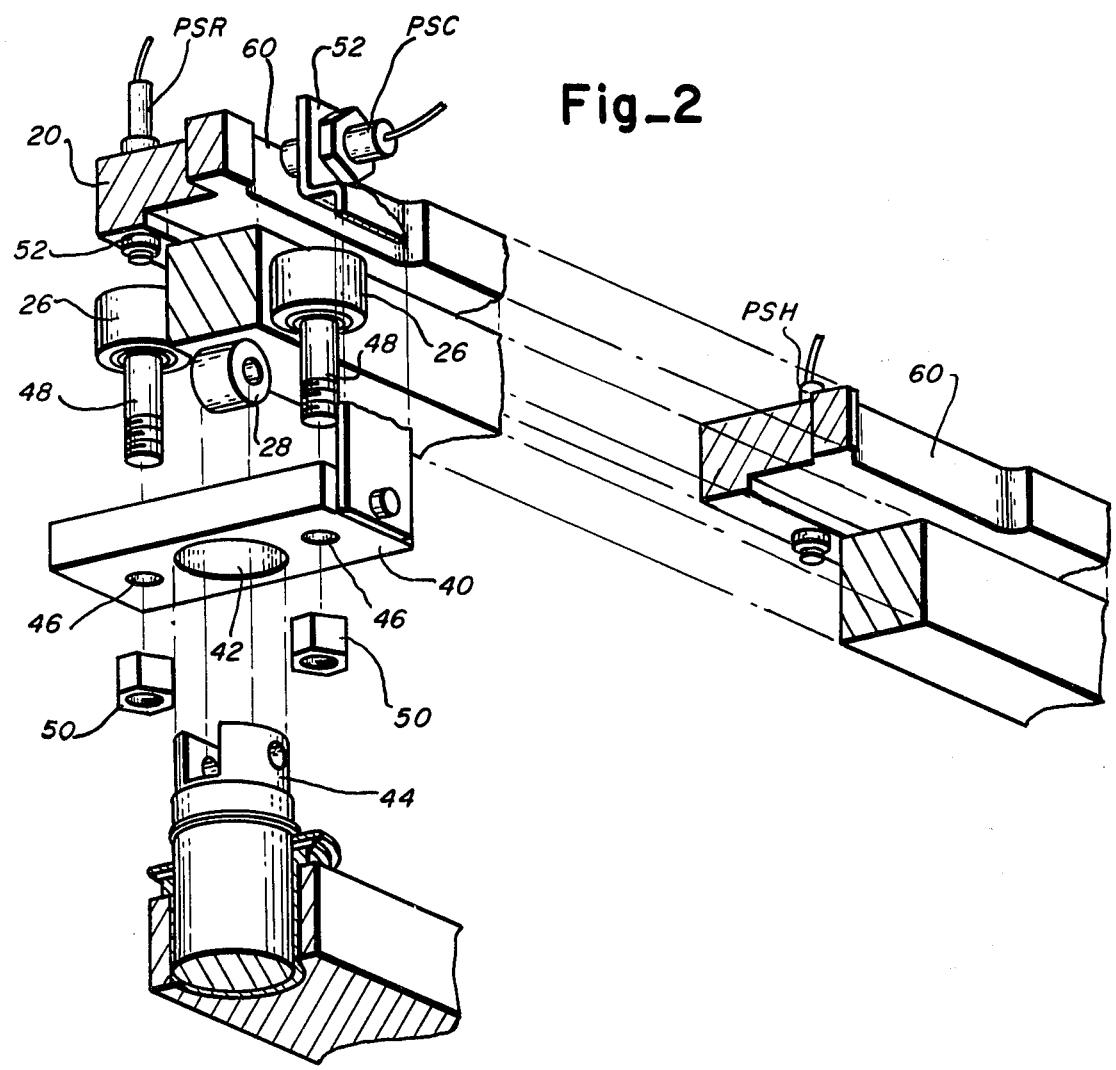
Fig_2
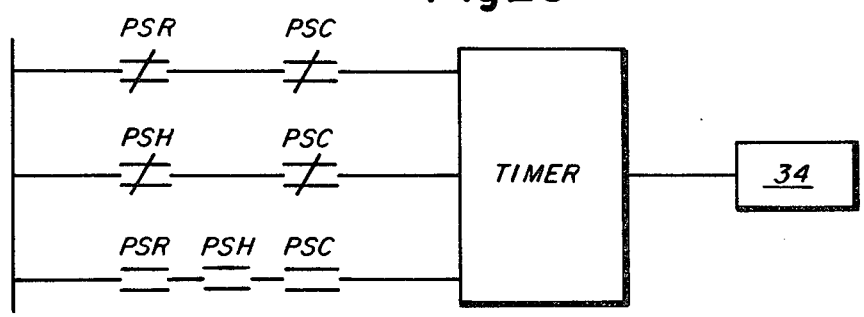
Fig_3

MACHINING CENTER

A machining center is a machine tool having a rotatable tool spindle and a tool changing and storing mechanism for storing a plurality of individually utilized tools and for sequentially transferring tools to and from the machine tool spindle. Such tool changing mechanisms may include a tool shuttle when a separate storage device, located at a remote location, is utilized. It is extremely important that the tool shuttle be stopped and located at specific locations so that accidents, either at the tool spindle or at the magazine, will not occur.

It is, accordingly, an object of the present invention to provide an improved tool shuttle which is to be stopped at predetermined ready and home positions.

Other objects and advantages of the present invention will become apparent from the following portion of the specification and from the accompanying drawings which illustrate, in accordance with the mandate of the patent statutes, a presently preferred embodiment incorporating the teachings of the invention.

REFERRING TO THE DRAWINGS:

FIG. 1 is a front elevational view of portions of a machining center;

FIG. 2 is a perspective view of portions of the tool shuttle assembly illustrated in FIG. 1 with the tool shuttle at the ready position proximate a tool spindle and with a portion thereof exploded for purposes of clarity; and FIG. 3 is a portion of the control circuit for controlling the operation of the machining center illustrated in FIG. 1.

The disclosed machining center includes a tool magazine 10, a tool spindle 11 and a tool shuttle assembly 12 having a tool change mechanism 13 which is selectively displaceable from right to left along a tool shuttle path from a first tool change location at the tool magazine to a second tool change location at the tool spindle. Proximate the tool spindle is a ready position (FIG. 1) for the tool shuttle and proximate the tool magazine is a home position also shown in phantom in FIG. 1. The shuttle path, which is fabricated from steel, is defined by a gear track 14 and by upper 16 and lower 18 rails, all of which are mounted in parallel on a support beam 20. The shuttle is mounted on the shuttle path utilizing two posts 22 and 24 with guide rollers 26 and wheels 28 (FIG. 2) mounted on opposite ends of each post which engage the interior and side surfaces of the upper and lower rails 16 and 18, and with a driven gear 30 mounted about one end of the post ends which engages the gear track 14. The driven gear 30 is driven by a reversible gear drive 32 which is the output of a dynamically brakeable motor 34, such as a D.C. Permanent Magnet Motor with an SCR controller.

The left-hand upper guide roller mount (FIG. 2) includes a bar 40 having a central bore 42 for matingly receiving a post end 44. A pair of vertical bores 46 receive a pair of guide roller shafts 48 having guide rollers 26 at one end and threads to receive nuts 50 at the other. Also secured to the post end is a wheel 28 for rollingly engaging with the interior rail surface.

Secured within an aperture 52 of the support beam 20 at the ready and home positions is a vertically oriented, normally-off, inductive type proximity switch PSR and PSH, respectively, which are located a selected distance above the guide rollers 26 so as to be turned on when a guide roller is located thereunder.

A magnetic reed-type proximity switch PSC is secured to an upwardly extending bracket 52 fixedly secured to the roller mount bar 40. This check switch is horizontally oriented and the spacing between this switch and the side wall of the support beam 20 is selected so that a predetermined switch condition (ON) will normally occur. A slot 60 is defined in the side wall of the support beam at the ready and home positions so that when the check switch PSC is proximate the slot, it will turn off.

The location of the home or ready proximity switches are selected to be above the guide roller when the tool shuttle is stopped by actuation of the check switch. The condition of the home or ready switches will be changed due to their sensing the metallic guide roller beneath it.

The control circuit, which controls the motor 34 as the shuttle is displaced from right to left, is shown in FIG. 3. As can be seen from this control circuit, should the check switch PSC and either the ready switch PSR or the home switch PSH switches be "on", the motor will stop. Additionally, if all three switches are conjointly "off", the motor will also stop.

The tool shuttle, which is being advanced from the magazine toward the tool spindle, should stop at the home position. As the tool shuttle approaches the home position, the ready and home switches are both "off" and the check switch is "on". If the check switch is improperly "off", the motor will stop (FIG. 3). If either of the switches at the home and ready positions PSR, PSH are improperly on, the motor 34 will also stop. When the check switch PSC senses the slot at the home location, it turns off and the motor will stop since all three switches are "off". Had the check switch not turned "off", as intended, the turning "on" of the ready switch PSH as the shuttle passes past it will generate a second "on" which will turn the motor "off". For the system to fail, two switches (PSH and PSC, for example), which sense opposite conditions (PSH senses the presence of metal and PSC senses its absence), would have to fail at the same time and this remote likelihood is further reduced by utilizing two dissimilar proximity switches.

The home switch is located at a central slot location so that the tool shuttle can be stopped at the home position whether traveling towards the tool spindle or the tool magazine.

The invention claimed is:
1. A machining center comprising
   a tool spindle,
   a tool magazine,
   a tool shuttle assembly for transferring tools between said tool spindle and said tool magazine including
     rail means,
     a tool change mechanism including a carriage,
       means for mounting said carriage on said rail means for displacement therealong,
       a dynamically brakeable motor for driving said tool change mechanism along said rail means in a selected direction,
     means for stopping said tool change mechanism driven in the selected direction, including
       first proximity switch means secured to said carriage at a selected spacing from said rail means for maintaining the condition of said proximity switch means as said carriage is displaced along said rail means, opening means in said rail means at a selected location for changing the condition of said first proximity switch means as said carriage means is displaced in the selected direction along said rail means, second proximity switch means secured to said rail means, said tool change mechanism including a projecting element for changing the condition of said second proximity switch means from a first condition to a second condition as said tool change mechanism is displaced therealong, said projecting element being selectively located and said opening being selectively configured so that said first and second proximity switches will simultaneously have said second condition when said tool change mechanism is at said predetermined position.

2. A machining center according to claim 1, wherein said first and second proximity switch means are dissimilar.

3. A machining center according to claim 2, wherein one of said switches is an inductive type proximity switch and the second of said switches is a magnetic reed type proximity switch.

* * * * *